United States Patent
Sharma et al.

(10) Patent No.: US 9,455,820 B2
(45) Date of Patent: Sep. 27, 2016

(54) METHOD AND SYSTEM FOR OPTIMIZING USER EQUIPMENT PERFORMANCE IN LONG TERM EVOLUTION CO-EXISTENT NETWORKS

(71) Applicant: Samsung Electronics Co., Ltd., Suwon-si, Gyeonggi-do (KR)

(72) Inventors: Neha Sharma, Bangalore (IN); Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 14/516,971

(22) Filed: Oct. 17, 2014

(65) Prior Publication Data

US 2015/0109918 A1    Apr. 23, 2015

(30) Foreign Application Priority Data

Oct. 17, 2013 (IN) .......................... 4672/CHE/2013
Aug. 22, 2014 (IN) .......................... 4672/CHE/2013

(51) Int. Cl.
| | |
|---|---|
| H04W 80/04 | (2009.01) |
| H04W 36/00 | (2009.01) |
| H04L 5/14 | (2006.01) |
| H04L 5/00 | (2006.01) |
| H04W 48/02 | (2009.01) |
| H04W 48/12 | (2009.01) |

(52) U.S. Cl.
CPC ............ *H04L 5/14* (2013.01); *H04W 36/0055* (2013.01); *H04L 5/0096* (2013.01); *H04L 5/1469* (2013.01); *H04W 48/02* (2013.01); *H04W 48/12* (2013.01)

(58) Field of Classification Search
CPC ......... H04W 72/048; H04W 36/0022; H04W 36/22; H04W 80/04; H04W 48/16
See application file for complete search history.

(56) References Cited

U.S. PATENT DOCUMENTS

| | | | | |
|---|---|---|---|---|
| 2006/0166694 A1* | 7/2006 | Jeong | ................... | H04W 48/16 455/525 |
| 2011/0117916 A1* | 5/2011 | Dahlen | ................. | H04W 48/08 455/436 |
| 2012/0040673 A1* | 2/2012 | Ying | ..................... | H04W 36/14 455/436 |
| 2012/0149378 A1* | 6/2012 | Li | ..................... | H04W 36/0055 455/438 |
| 2012/0182896 A1* | 7/2012 | Jang | .................... | H04W 28/048 370/252 |
| 2012/0282968 A1* | 11/2012 | Toskala | ................. | H04W 24/10 455/517 |
| 2013/0281090 A1* | 10/2013 | Maeda | .................. | H04W 48/02 455/434 |
| 2013/0301552 A1* | 11/2013 | Xu | ........................ | H04W 4/005 370/329 |
| 2014/0153485 A1* | 6/2014 | Tsuda | .................... | H04W 36/32 370/328 |
| 2014/0307698 A1* | 10/2014 | Beale | .................... | H04L 5/0044 370/329 |
| 2015/0092566 A1* | 4/2015 | Balachandran | ......... | H04W 8/22 370/242 |
| 2015/0111579 A1* | 4/2015 | Arunachalam | ... | H04W 36/0083 455/436 |
| 2015/0181508 A1* | 6/2015 | Uchino | ................. | H04W 48/16 455/434 |

* cited by examiner

*Primary Examiner* — Andrew Lee
(74) *Attorney, Agent, or Firm* — Jefferson IP Law, LLP (57) ABSTRACT

The present invention provides a method and system for optimizing user equipment performance by having faster resumption of services during co-existence of LTE Frequency division duplexing (FDD) and Time division duplexing (TDD) networks. The method includes determining whether the UE is able to acquire essential system information (SI) associated with a cell or frequency which is barred by the UE. Further, the method includes removing the barring restriction conditionally for that cell or frequency which is barred by the UE if the UE is able to acquire the essential system information associated with the cell frequency. Furthermore, the method includes, allowing the UE to camp on the cell or frequency whose essential SI has been acquired by the UE and resuming the service with the cell and frequency. Furthermore, it also includes the method to have seamless handover between TDD and FDD and vice versa.

18 Claims, 9 Drawing Sheets

METHOD AND SYSTEM FOR OPTIMIZING USER EQUIPMENT PERFORMANCE IN LONG TERM EVOLUTION CO-EXISTENT NETWORKS

PRIORITY

This application claims priority under 35 U.S.C. §119(a) to Indian Provisional Application No. 4672/CHE/2013 filed on Oct. 17, 2013, and Indian Complete Application No. 4672/CHE/2013 filed on Aug. 22, 2014, the contents of which are incorporated herein by reference.

BACKGROUND

1. Field of the Invention

The present invention generally relates to the field of wireless communication and more particularly relates to a method and system for optimizing user equipment performance in long term evolution Frequency division duplexing (FDD) and Time division duplexing (TDD) co-existent networks.

2. Description of the Related Art

Figure 1:
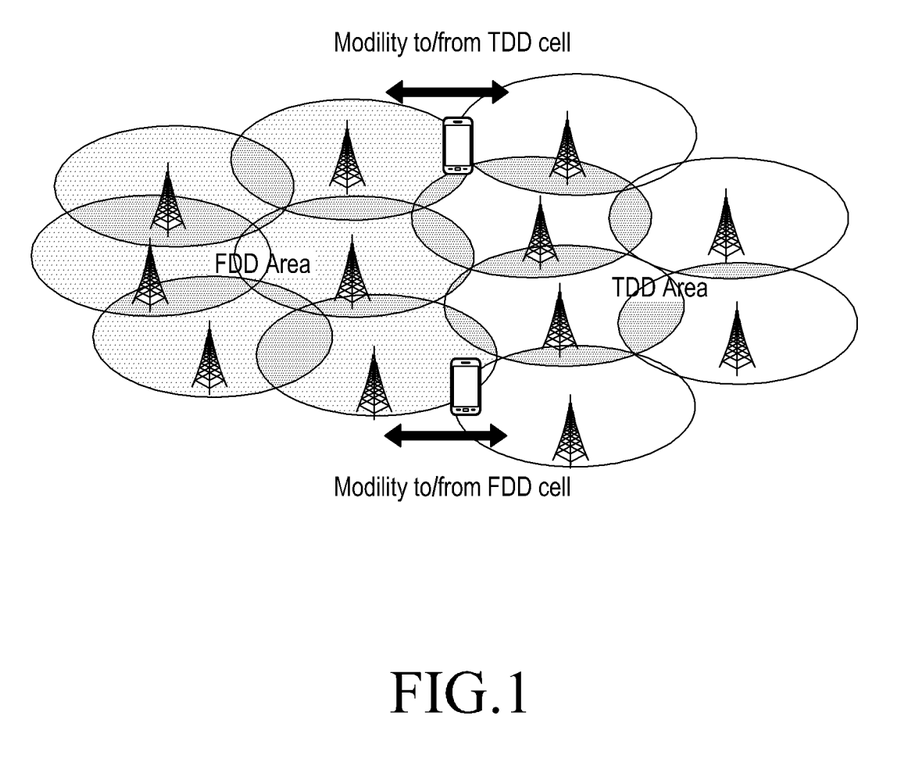
FIG. 1 illustrates a schematic representation of interworking of two LTE modes with off loading capability.

With the increase in the number of wireless technology subscribers, there is a dearth in the available resources that can be allocated to a subscriber. This has led to the introduction of a lot of new techniques as well and methods for allocating more users or providing more resources to each subscriber, including the use of increased bandwidth or additional bands. Apart from these, many operators around the globe are preparing for joint deployment of time division multiplexing (TDD) and frequency division multiplexing (FDD) based systems where TDD based systems can provide the freedom to configure variable number of resources for downlink and uplink. Interworking between LTE FDD and LTE TDD in networks will be of increasing importance for operators that have spectrum for both LTE modes. It will allow operators to seamlessly offer Mobile Broadband services on FDD and TDD spectrum, increasing capacity and improving consumer experience. Many operators with FDD-LTE networks also own spectrum suitable for TDD-LTE services. With offloading capability, the two LTE modes can work hand in glove as shown in FIG. 1. As multimode devices supporting both FDD and TDD-LTE become more common, operators will be able to take full advantage of their spectrum allocations and deploy TDD-LTE as an integral part of their overall mobile broadband service. There are various ways in which handover can be triggered from FDD to TDD or vice versa. The network triggers the handover procedure e.g. based on radio conditions, load. Few conventional mechanisms are    RRC Connection Release with Redirection between TDD and FDD    TDD to FDD and FDD to TDD Inter-Frequency handover (X2 & S1) with traffic. This includes:

a) Different triggers-based handover i.e. with measurement reports      b) Blind FDD/TDD handover, i.e. without having received measurement reports      c) The possible UE scenario where handover can be triggered    Case 1: NW may move the UE to TDD/FDD during establishment of VOLTE calls or during VOLTE call itself    Case 2: NW may initiate the connected mode handover during the Attach/TAU/NAS procedure    Case 3: NW may initiate the handover during data call due to load balancing or poor radio condition Assuming a case where EUTRAN TDD-FDD joint deployment is present at the same place, the following deployments are possible:

1. Multiple FDD cells and 1 TDD cell.
   2. Multiple TDD cells and 1 FDD cell.
   3. 1 FDD cell and 1 TDD cell overlapped with same or different coverage.
   4. 1 TDD cell with 1 neighbor FDD cell and vice versa
   5. FDD cells alone
   6. TDD cells alone The current standards do not address to handle error cases possible during mobility between TDD-FDD and vice-versa.

Therefore, there is need for method and system for optimizing user equipment performance in long term evolution FDD and TDD co-existent networks in order to provide faster resumption of service while moving from TDD to FDD area or vice versa.

SUMMARY

An embodiment of the present invention describes a method of optimizing user equipment performance in long term evolution FDD and TDD co-existent networks. The method comprises searching at least one of a cell and frequency by a user equipment in idle mode to establish a network connection, switching the network connection to the at least one of the cell and frequency on receiving handover command from the network, acquiring system information (SI) of the at least one of a cell and frequency barred by the user equipment (UE), unbarring at least one of a barred cell and barred frequency by the user equipment, and establishing a connection of the user equipment with the long term evolution network. The same is applicable even in the case of carrier aggregation and in LTE dual connectivity mechanism where there are connections from a single UE to multiple eNodeBs. If a barred cell is configured as Secondary cell (Scell) or as Primary cell (Pcell) or a pScell (cell belonging to small eNB/SCG with configured uplink control channel, in dual connectivity scenario), then the barring restriction on these cells are removed.

Another embodiment of the present invention describes a method of optimizing user equipment performance in long term evolution FDD and TDD co-existent networks. The method comprises receiving at least one instruction at the user equipment for switching a network connection from a first network to a second network, searching at least one of a cell and frequency by the user equipment in the second network, barring the at least one cell based on PLMN (Public land mobile network) mismatch and allowing the frequency in one or more cells in the second network for establishing network connection to keep the user equipment in service for longer period, where one of a LTE FDD and LTE TDD frequency being common to different PLMNs, and establishing a connection of the user equipment with the long term evolution network.

Yet another embodiment of the present invention describes a method for optimizing user equipment performance in long term evolution FDD and TDD co-existent networks. The method comprises determining a network load of a first network, providing a handover command signal to a second network for sharing the network load when the load of the network exceeds a predefined network load, and executing a process to handover at least one active connection of at least one user equipment from the first network to the second network.

An embodiment of the present invention describes a system for optimizing user equipment performance in long term evolution FDD AND TDD co-existent networks. The system comprises means for searching at least one of a cell and frequency by a user equipment in idle mode to establish a network connection, means for switching the network connection to the at least one of the cell and frequency on receiving handover command from the network, means for acquiring system information (SI) of the at least one of a cell and frequency barred by the user equipment (UE), means for unbarring at least one of a barred cell and barred frequency by the user equipment, and means for establishing a connection of the user equipment with the long term evolution network. The same is applicable even in the case of LTE dual connectivity mechanism where there are connections from a single UE to multiple eNodeBs. If a barred cell is configured as Secondary cell (Scell) or as Primary cell (Pcell) or a pScell (cell belonging to small eNB/SCG with configured uplink control channel, in dual connectivity scenario), then the barring restriction on these cells are removed.

Another embodiment of the present invention describes a system of optimizing user equipment performance in long term evolution FDD and TDD co-existent networks. The system comprises means for receiving at least one instruction at the user equipment for switching a network connection from a first network to a second network, means for searching at least one of a cell and frequency by the user equipment in the second network, means for barring the at least one cell based on PLMN (Public land mobile network) mismatch and allowing the frequency in one or more cells in the second network for establishing network connection to keep the user equipment in service for longer period, where one of a LTE FDD and LTE TDD frequency being common to different PLMNs, and means for establishing a connection of the user equipment with the long term evolution network.

Yet another embodiment of the present invention describes a system for optimizing user equipment performance in long term evolution FDD and TDD co-existent networks. The system comprises means for determining a network load of a first network; means for providing a handover command signal to a second network for sharing the network load when the load of the network exceeds a predefined network load, and means for executing a process to handover at least one active connection of at least one user equipment from the first network to the second network.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention provides a method and system for optimizing user equipment (UE) performance in a long term evolution (LTE) FDD/TDD co-existent networks. The method includes optimization towards minimizing no service scenarios in TDD-FDD joint deployment by enhancing the frequency and cell barring mechanism. It also enhances the connected mode handover procedures and connection release procedures between TDD and FDD and vice versa. Optimization Towards Minimizing No Service Scenarios in TDD-FDD Joint Deployment In an embodiment, the present invention provides a method for optimizing UE's performance in order to minimize no service scenarios in TDD-FDD joint deployment. In the existing art, when an essential system information associated with a cell/frequency is missed by UE during its radio resource control (RRC) idle state or RRC Connection state and when the timer T311 is running, the camped cell/frequency gets barred based on system information blocks (SIB) which are missed. According to 36.304, this barring is applicable for 300 seconds and during this time, the UE is prohibited from performing cell selection/reselection on the barred cell or frequency. It has been found that due to this barring issue UE most of the time ends up moving into "No service".

Figure 2A:
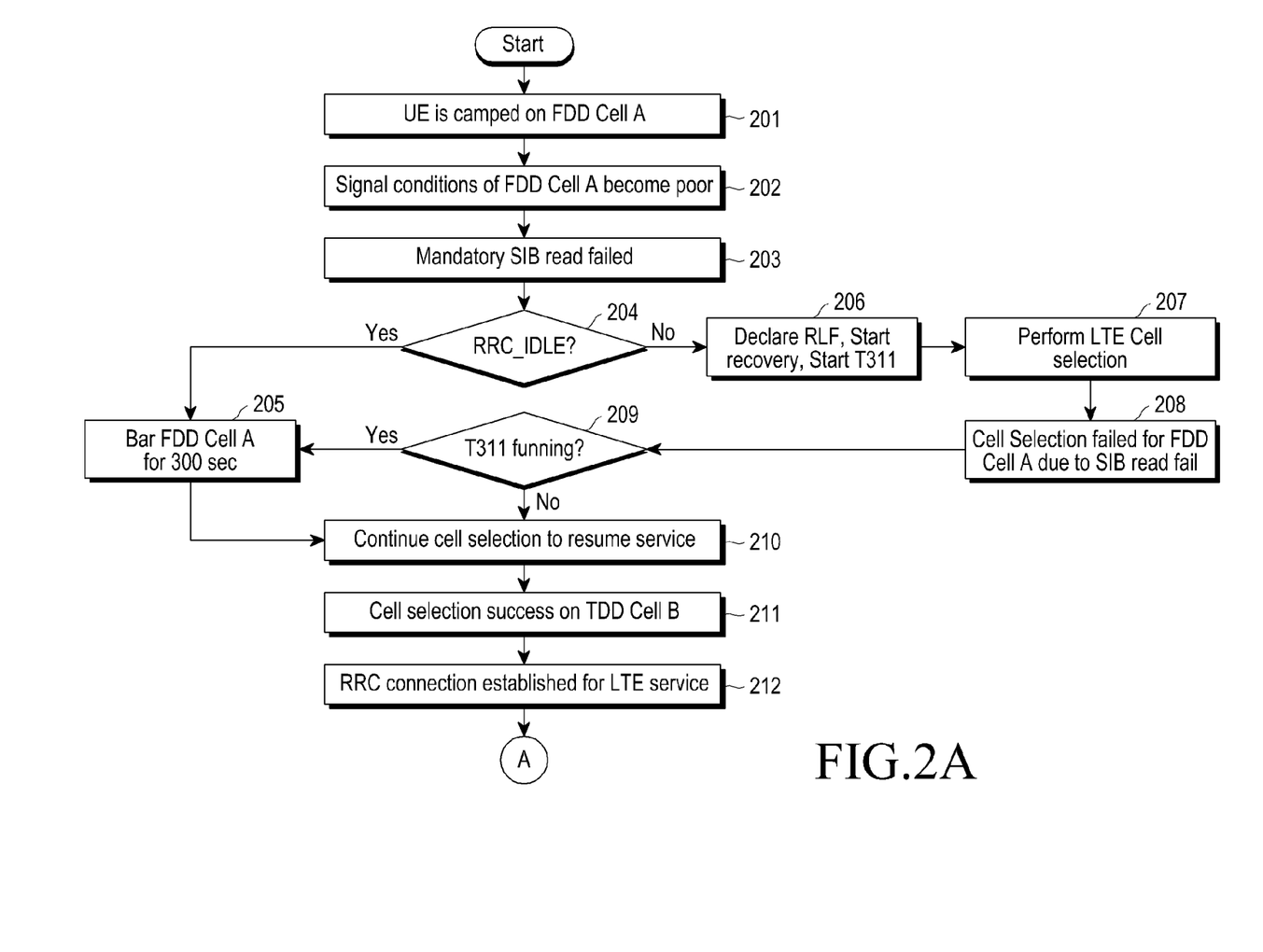
FIG. 2A and FIG. 2B illustrate flowcharts of a process of handling of barred cell and/or frequency by user equipment (UE), according to a prior art.
Figure 2B:
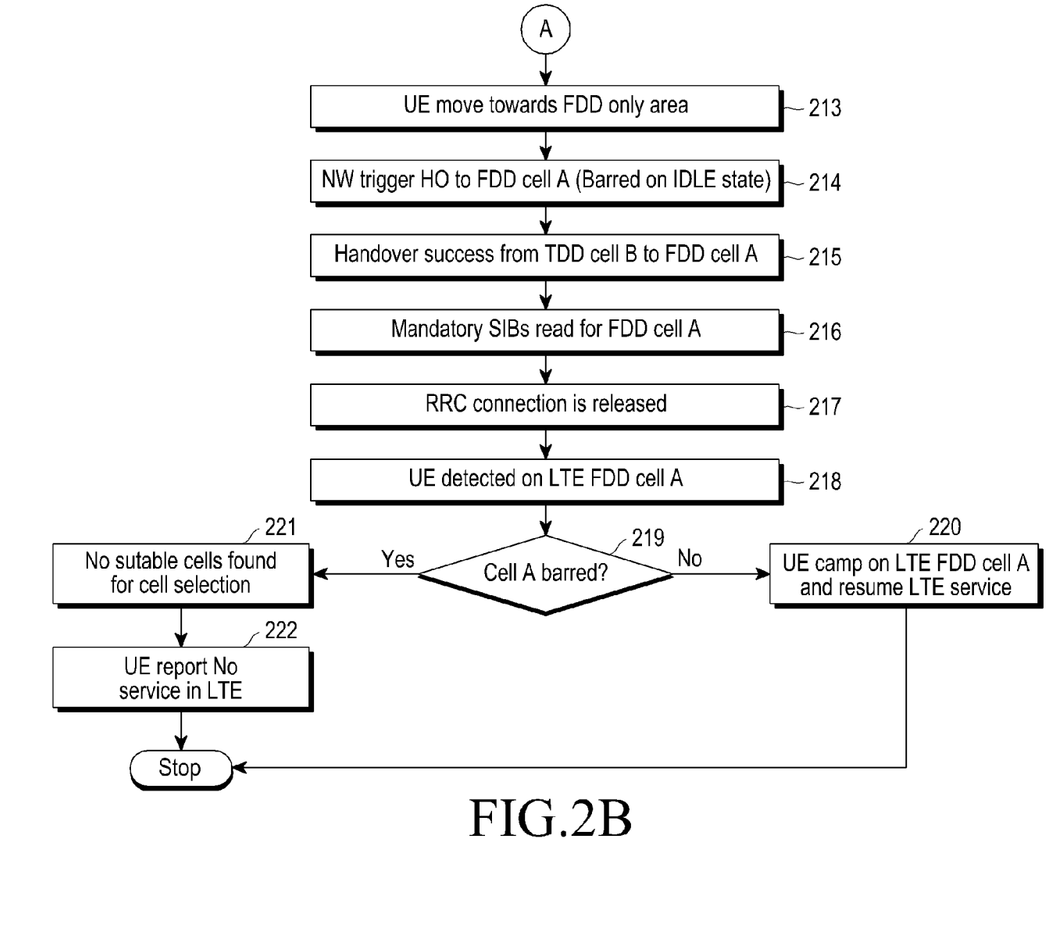

FIG. 2A and FIG. 2B are flowcharts illustrating a process of handling of barred cell/frequency by the UE, according to the existing art. Accordingly, consider the UE which is camped on a FDD cell is moving towards TDD only area. Upon initiating the RRC connection reestablishment procedure which can be due to RLF, integrity check failure, handover failure etc, the UE will start the T311 timer. Now, if the mandatory System Information Block (SIB) read is failed in IDLE state or in CONNECTED state when the timer T311 is running, then the FDD cell/frequency is barred for 300 seconds. If the user again moves back to FDD area (No or weak TDD area), and if the 300 second barring timer is still running, then the UE would not camp on the FDD cell/frequency. The UE is now prohibited from performing cell (re)selection to barred cell/frequency. Hence, the UE remains in no service till the barring timer expires. But, there is no restriction for handover on the barred cell if network (NW) commands to do the same as shown in FIG. 2A and FIG. 2B. It has been found many times that when the NW gives a handover command for barred cell to the UE, the UE performs the HO successfully without any restriction. But, as soon as UE goes to idle mode the cell is again considered as barred as the timer is still running. Hence, the UE ends up moving into NO service if no other cell is present in that area. The steps of the process are illustrated in detail below:

UE is camped on FDD cell A at step 201. As the UE moves towards TDD cells network, signal conditions of FDD cell A become poor at step 202 which results in failure of reading mandatory System Information Block (SIB) at step 203. UE is in IDLE or connected state is determined at step 204. If the UE is in idle state, FDD cell A is barred for 300 seconds at step 205. In case the UE is in connected mode, declaration is given for radio link failure (RLF) and network recovery is initiated at step 206. LTE cell selection is performed at step 207. In case the cell selection still fails for FDD Cell A due to failure to read SIB information at step 208, T311 running status is determined at step 209. If T311 is running, FDD cell is barred for 300 seconds at step 205. Cell selection process is performed to resume service at step 210. On successful cell selection on TDD Cell B at step 211, RRC connection is established for LTE service at step 212. In this case, UE moves towards FDD area at step 213. At step 214, network triggers HO to FDD cell A which is already barred and cannot be considered for idle mode procedures. In other condition such as connected mode, network connection is successfully handed over to FDD cell A from TDD cell B at step 215. Mandatory SIB information is read for FDD cell A at step 216. RRC connection is released for establishing network connection of UE with FDD cell A at step 217. UE detected LTD FDD cell A at step 218. Cell A barred status is checked at step 219. If the Cell A is not barred, UE camp on LTE FDD cell A and resume LTE service at step 220. If Cell is barred, and UE does not find any suitable cell for cell selection at step 221 then UE reports No service in LTE at step 222.

Unbarred the Cell after Handover

Figure 3A:
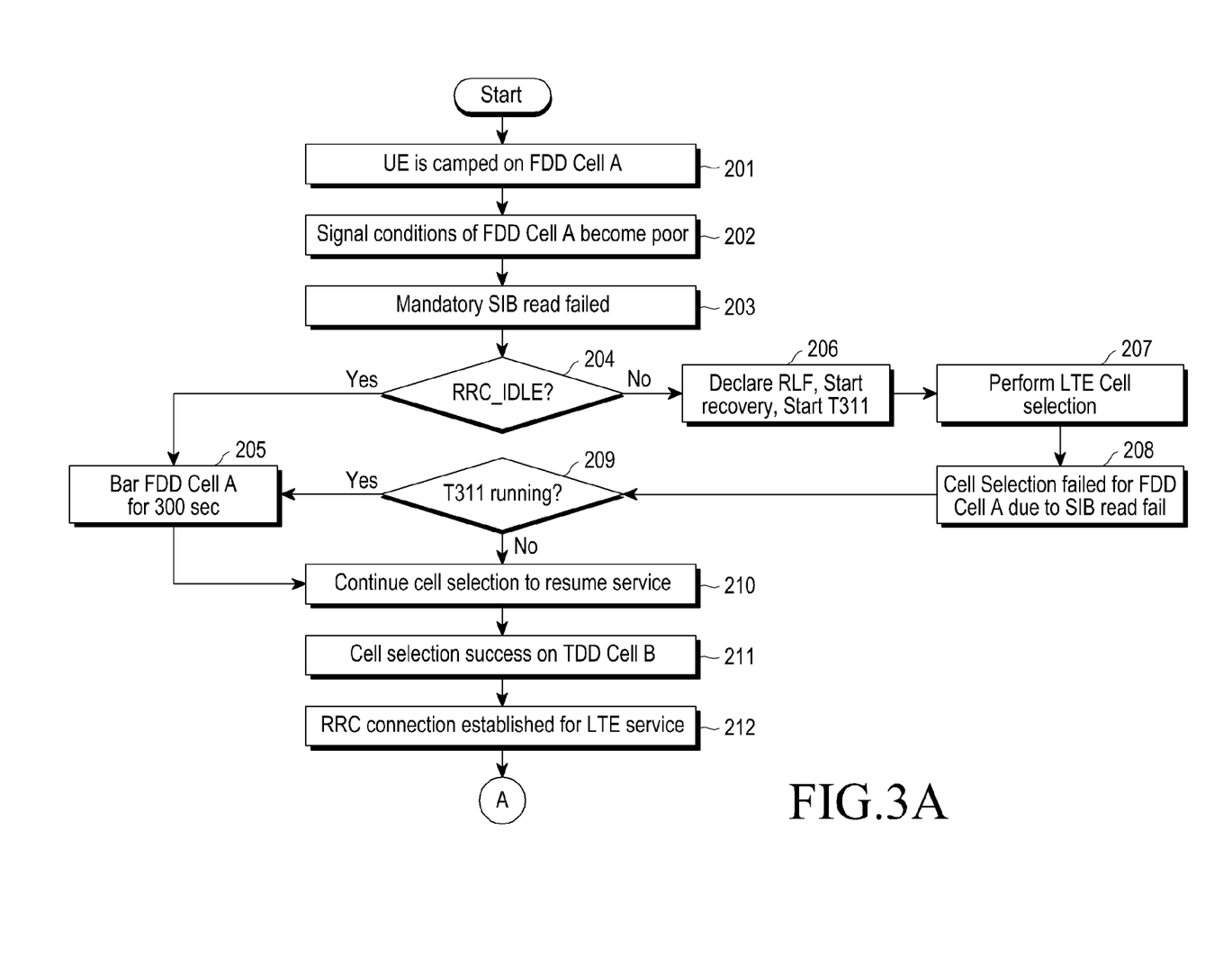
FIG. 3A and FIG. 3B illustrate flowcharts of a method of optimizing UE by unbarring the cells and/or frequency when the essential system information (SI) for that cell and/or frequency which were barred by the UE are available after handover is completed, according to an embodiment of the present invention.
Figure 3B:
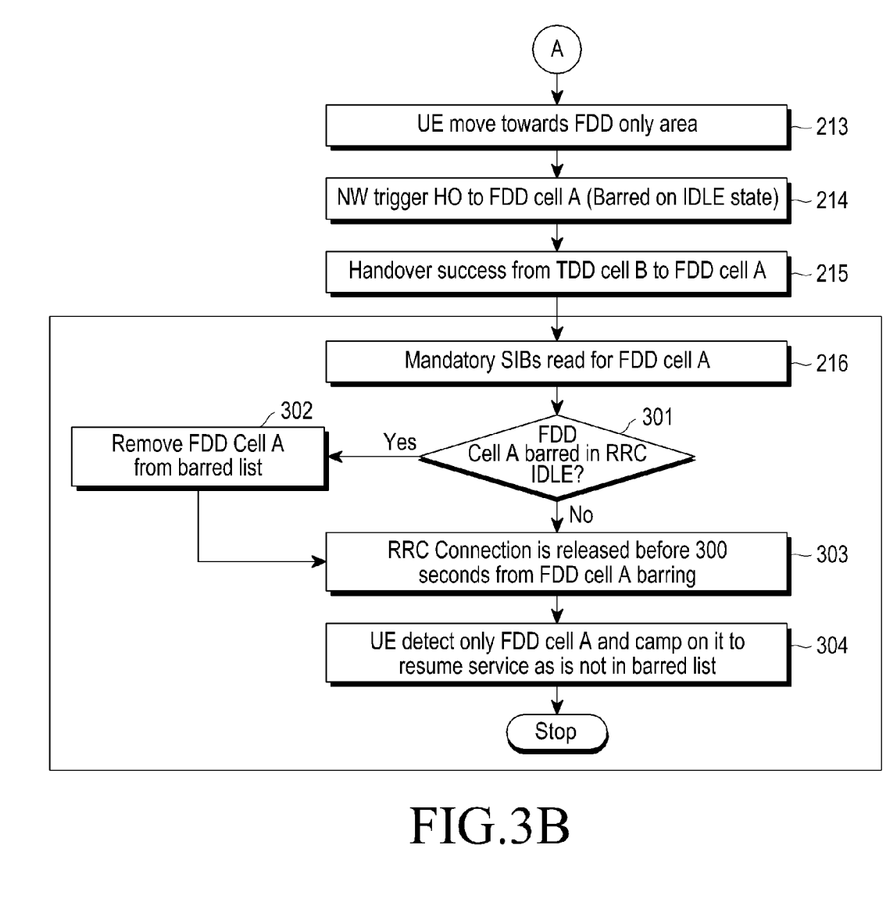

FIG. 3A and FIG. 3B illustrate flowcharts of a method of optimizing the user equipment (UE) by unbarring the cells/frequency when the essential SI for that cell/frequency which were barred by the UE are available after handover is completed, according to an embodiment of the present invention. The method disclosed in FIG. 3A and FIG. 3B overcomes the problem mentioned in FIGS. 2A and 2B. The description mentioned for steps 201 to 216 in FIG. 2A and FIG. 2B is same in FIG. 3A and FIG. 3B as well. Once the system information is read at step 216, a check is performed to determine whether FDD cell A is barred in RRC IDLE at step 301. If yes, FDD Cell A is removed from barred list at step 302. At step 304, in region where only FDD cell A is available and RRC connection is released before 300 seconds (at step 303) from earlier barring the FDD cell A at step 205, the UE is allowed to select FDD cell A and resume idle mode procedures as the cell has been removed from barred status at step 302.

According to this embodiment, after RRC connection is released post successful handover to barred cell/frequency only once it acquired the system information on the new cell, UE is allowed to camp on the previously barred cell before 300 seconds expiry. The cell was originally barred by the UE due to essential system information missing or either due to the NW not sending SI or UE failing to decode the mandatory SIs due to weak signal conditions. When the UE acquires the essential SI for the barred cell/frequency after the handover is completed to this cell, then the UE removes the barring restriction to this cell/frequency thereby making the cell/frequency available for cell selection/reselection (if the 300 seconds barring timer is still running). Once RRC connection is released, the UE tries to camp in RRC IDLE state and if FDD cell/frequency (which is originally barred but restriction is removed after receiving HO) is found then UE will camp on this FDD cell and resume service on LTE. The same is applicable for removing barring on TDD cell. Without this optimization, UE would have been in no service till the barring timer expiry. Also, the barring restriction can be removed only for cells/frequency which has been barred by the UE, and not the cells for which NW has indicated barring restriction in SIB 1.

Unbarred the Cell after Getting any PLMN Scan

According to another embodiment, if during any public land mobile networks (PLMN) or specific PLMN scan or Manual scan, the UE is unable to detect any other suitable or acceptable cell apart from the cell it is barred, then the UE unbars the barred cell if it is able to acquire essential system information. The UE camps on the cell to avail normal or limited service. Also, the barring restriction is removed only for cells/frequency which has been barred by the UE, and not the cells for which the network (NW) has indicated barring restriction in SIB 1.

Unbarred the Cell in Idle Mode

According to yet another embodiment, when the UE goes to idle mode and if it is unable to detect any other cell apart from the cell it has barred, then the UE unbars that cell if it is able to acquire essential system information. The UE camps on the cell to avail normal or limited service. Also, the barring restriction is removed only for cells/frequency which has been barred by the UE, and not the cells for which the network (NW) has indicated barring restriction in SIB 1.

According to one exemplary embodiment, when the UE is camped on an LTE FDD PCI A in an RRC idle state the following operations takes place:

1. UE is camped on LTE FDD Physical cell id (PCI) A in RRC IDLE state and signal conditions are weak.
2. UE finds that the Essential SI decoding is failed and hence the cell is barred for 300 seconds. Therefore, the cell cannot be a candidate for cell selection/reselection.
3. Consider now, if the UE is camped on LTE TDD PCI B and has entered RRC CONN State. The NW configures the neighbor measurements on the same frequency.
4. The PCI A (present in barred list) is found and measurement report is sent to NW after the corresponding event is met.
5. The NW sends a RRC connection reconfiguration with mobility control info containing LTE FDD PCI A as the target cell to the UE.
6. A handover (HO) from TDD PCI B to FDD PCI A is completed successfully and essential SI on FDD PCI A is acquired by the UE.
7. As essential SI has been acquired for this cell by the UE, the UE removes this cell from the barred list in order to make it a candidate for cell selection/reselection.
8. RRC connection is released on FDD PCI A.
9. Assuming step 3 to step 8 all happening in less than 300 seconds, then the UE can camp on FDD PCI 10 which otherwise is not allowed as the cell is in barred list.

Optimization Towards Frequency Barring in TDD-FDD Joint Deployment

Consider a case where multiple LTE frequencies (not bands) that are common/shared between multiple operators/PLMN. Presently, 3gpp specification mandates that if the highest ranked cell or best cell according to absolute priority reselection rules is an inter-frequency cell which is not suitable due to the cell belonging to a PLMN and which is not indicated as being equivalent to the registered PLMN, then the cell and all the cells of the same frequency are treated as barred for a maximum of 300 seconds.

Figure 4:
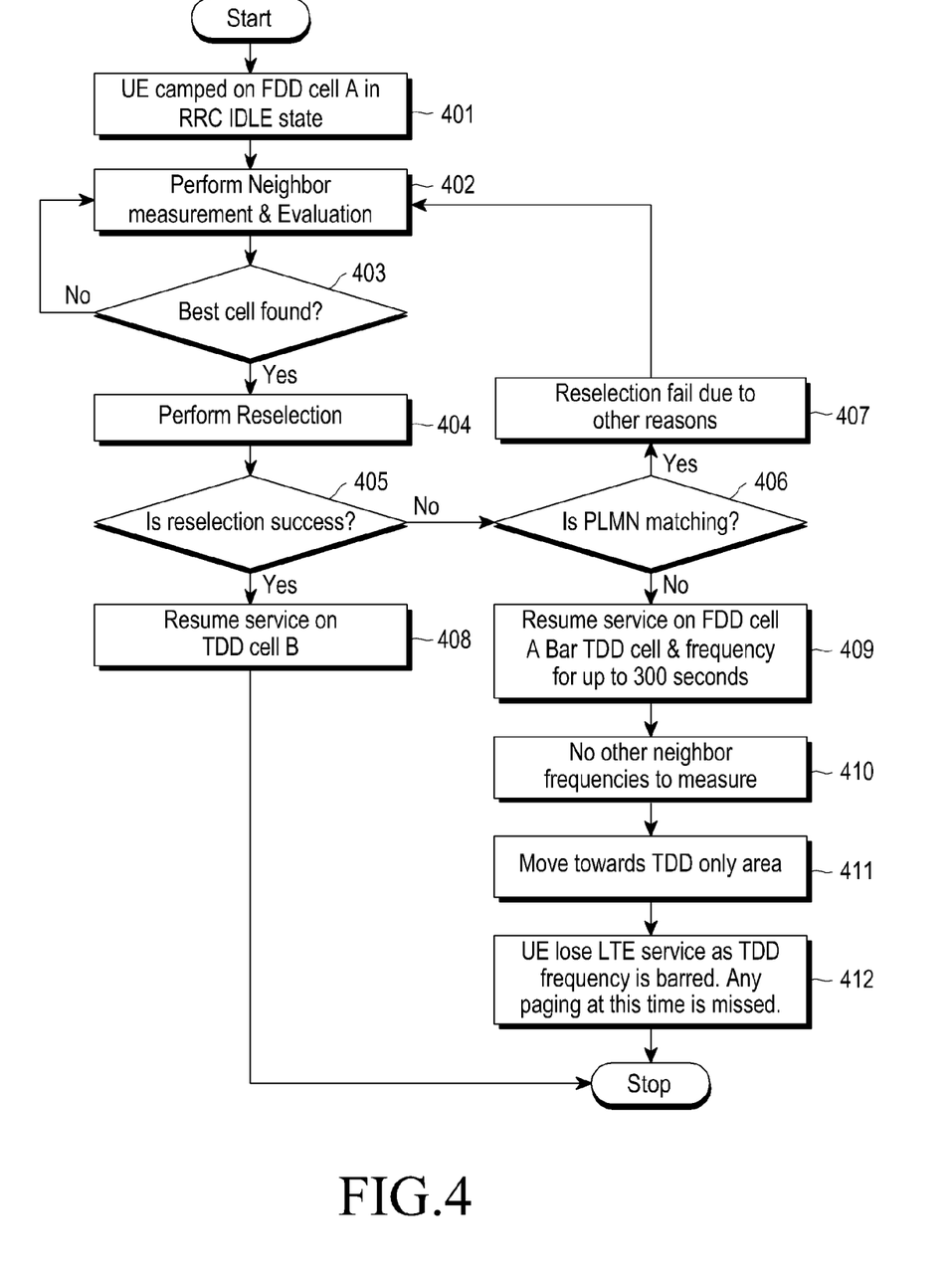
FIG. 4 illustrates a flowchart of a process of barring of frequency due to PLMN mismatch and impact of the same in UE, according to a prior art.

FIG. 4 is a flowchart illustrating process of barring of frequency due to PLMN mismatch and impact of the same in UE, according to existing art. Accordingly, consider a exemplary case where the UE in FDD cell belonging to PLMN 'X' received a SIBS with neighbor EUTRAN TDD frequency 'F' (here EUTRAN refers to Evolved Universal Terrestrial Radio Access network). This EUTRAN TDD frequency 'F' is common/shared for both PLMN 'X' and PLMN 'Y' (PLMN 'Y' is not a part of EPLMN/EHPLMN list of PLMN 'X' and vice versa). Here EPLMN refers to Equivalent public land mobile network and HPLMN refers to Home public land mobile network. Now, when a TDD cell satisfies the reselection criteria, the reselection is attempted to this TDD cell. If the TDD cell belongs to PLMN 'Y', then the UE bars the entire TDD frequency 'F' for 300 seconds and this is not considered for cell (re)selection. If the UE is moving from FDD area to strong TDD area (or vice versa), the UE may go to no service as the TDD frequency is barred due to PLMN mismatch. The steps of the process are illustrated in detail below:

UE camped on FDD cell A in RRC IDLE state at step 401. UE performs measurement and evaluation in neighbor networks at step 402. A check is performed to determine the detected cell is best cell at step 403. If no, performs the step 402 again to find the best cell. If yes, UE performs reselection at step 404. Reselection success is checked at step 405. If no, check if the reselection failed due to PLMN mismatch. If PLMN is matching, reselection failed due to other reasons at step 407 and so performs the step 402 again. If reselection success is yes at step 405, UE resumes service on TDD cell B at step 408. If PLMN match is NO at step 406, UE resumes services on FDD cell A and bar TDD cell and frequency for upto 300 seconds. UE does not have any other neighbor frequency to measure at step 410. UE moves towards TDD network at step 411. UE loses LTE service as TDD frequency is barred at step 412.

Figure 5:
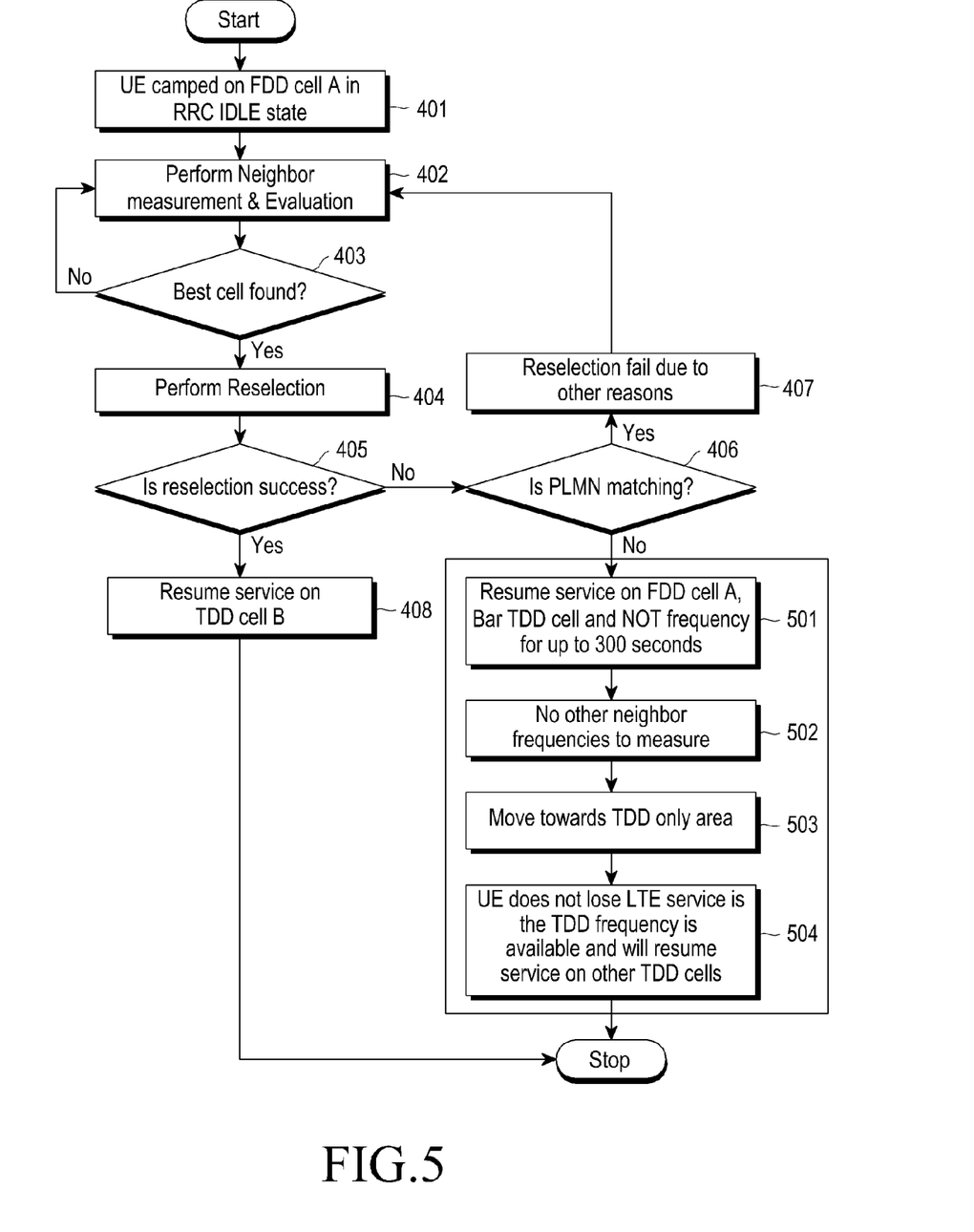
FIG. 5 illustrates a flowchart of a method of optimizing the UE's performance towards frequency barring in TDD-FDD joint deployment, according to an embodiment of the present invention.

FIG. 5 illustrates a flowchart of an exemplary method of optimizing the UE's performance towards frequency barring in TDD-FDD joint deployment, according to the present invention. This embodiment of the present invention overcomes the drawback of mentioned in FIG. 4 (i.e. FDD to TDD reselection failure due to PLMN mismatch, and vice versa). The embodiment describes that after PLMN mismatch at step 406, UE bars only the cell on which reselection failed and not the entire frequency at step 501. There are no other neighbor frequencies to measure at step 502 and UE is moving towards the TDD area at step 503. By removing the restriction of frequency barring, other cells present on the frequency on which TDD cell is barred at step 501 is still available and can be monitored as a candidate for idle state mobility and has a higher probability of remaining in service while moving from FDD to TDD area or vice versa (step 503) in countries/regions where the same LTE FDD (or TDD) frequencies are common to different PLMNs which are not in equivalent list to each other. Thus, UE does not lose LTE service as the TDD frequency is available and will resume service on other TDD cells at step 504. This scenario is observed in border areas where UE is not camped on its HPLMN but can find cells belonging to HPLMN from intra/inter frequency reselections. This may lead to barring of that frequency. However, during periodic search to acquire service on HPLMN, UE selects the cell belonging to HPLMN (cell selection). But, the UE cannot reselect to other cells on HPLMN as the frequency will be barred for reselection (due to PLMN mismatch during reselection evaluation when UE was camped on Visited Public land mobile network (VPLMN)).

Delay in Handover Procedure Due to Signalling Bearer Establishment

In one embodiment, the present invention provides a mechanism for optimizing the UE's performance by triggering handover when only signalling bearers are established.

According to this current art, when the NW initiates the connected mode HO when the SRB2 with at least one DRB are setup and when the NW wants to move the UE between TDD and FDD based on load or so, NW sends UE through RRC connection release to move to TDD/FDD. This requires additional signalling exchange between UE and NW in case data is there as it has to establish the connection again. Also, in case the NW requires the UE to do the registration on FDD/TDD based on deployment. In such a case, UE triggers the request FDD/TDD to the network so that it can directly give handover command to TDD/FDD. If this condition is relaxed then NW directly does the handover. Few exemplary cases are given below where NW sends handover command for TDD/FDD deployment without having DRB:
1. NAS level signalling
2. Signalling along with data request
3. While NAS signalling is going on data request has initiated/received Modify the Handover Condition In one embodiment, the present invention provides a solution to the above illustrated problem in the existing systems. According to this embodiment, this part of specification is modified specially for inter system/inter frequency handover cases between FDD/TDD. The NW sends handover command to TD-LTE when it is camped on FD-LTE and no DRB are established. So, the above mentioned condition is modified where during TDD/FDD handover we need not check DRB (Data Radio Bearer) condition. When FDD NW is loaded and the NW wants to offload some UEs in CONNECTED state to TDD cells (and vice versa), this fast HO mechanism can be used instead of sending RRC connection reject message. This procedure can also be used by NW to ensure load sharing between TDD and FDD networks where following such HO. Under such cases, after RRC connection is released on the target cell (say TDD cell), UE performs cell selection for TDD cell first. The same is applicable for fast HO from TDD to FDD as well.

Faster Redirection to TDD/FDD—LTE

Another problem in the existing system relates to producing delay in some network implementation in immediate call establishment after redirection, e.g., in case of VOLTE call or during any data call or any signaling message. For example, one of the methods to do handover between TDD and FDD is through RRC connection release message. The NW sends redirection info for TDD/FDD cells. Once UE syncs to the target cell, UE needs to read all the essential SIB to camp on the same. This can cause some delay in resuming the service based on channel condition and other error cases. With the current specification version, redirection to E-UTRAN (TDD/FDD) requires the UE to acquire system information from the selected EUTRAN cell. This will lead to considerable delay in some network implementation in immediate call establishment after redirection, e.g., in case of VOLTE call or during any data call or any signaling message.

Enhancement to Release Message

In an embodiment, the present invention provides a method to reduce the delay mentioned above in some network implementation by enhancing the information contained in the release message as a solution to the above said problem. In other words, Redirection to E-UTRAN is enhanced so that E-UTRAN system information and cell id can be provided in the RRC ConnectionRelease message, together with redirection information. It can do that by adding new IE which will have "cellInfoList" for LTE contains physical cell id, system information.

Enhancement to RRC Connection Reject Message

In an alternate embodiment, in case once data call is initiated in TDD/FDD, the UE sends the RRC connection request for the same. If the NW wants the UE move to FDD/TDD it sends RRC connection reject with redirection information along with system information and cell id to FDD/TDD. UE adds new IE for the same. This embodiment is also applicable to overcome the drawback of the existing art in Universal Terrestrial Radio Access (UTRA) network.

An embodiment of the present invention describes a system for optimizing user equipment performance in long term evolution FDD AND TDD co-existent networks. The system comprises means for searching at least one of a cell and frequency by a user equipment in idle mode to establish a network connection, means for switching the network connection to the at least one of the cell and frequency on receiving handover command from the network, means for acquiring system information (SI) of the at least one of a cell and frequency barred by the user equipment (UE), means for unbarring at least one of a barred cell and barred frequency by the user equipment, and means for establishing a connection of the user equipment with the long term evolution network. Here the means for searching is performed using a processor and a transceiver, the means for switching the network connection is performed using a processor, the means for acquiring system information (SI) is performed using a processor and a transceiver, the means for unbarring is performed using a processor, the means for establishing is performed using a processor and a transceiver.

Another embodiment of the present invention describes a system of optimizing user equipment performance in long term evolution FDD and TDD co-existent networks. The system comprises means for receiving at least one instruction at the user equipment for switching a network connection from a first network to a second network, means for searching at least one of a cell and frequency by the user equipment in the second network, means for barring the at least one cell based on PLMN (Public land mobile network) mismatch and allowing the frequency in one or more cells in the second network for establishing network connection to keep the user equipment in service for longer period, where one of a LTE FDD and LTE TDD frequency being common to different PLMNs, and means for establishing a connection of the user equipment with the long term evolution network. Here the means for receiving is performed using a processor and a transceiver, the means for searching is performed using a processor and a transceiver, means for barring is performed using a processor and a transceiver, means for establishing is performed using a processor and a transceiver.

Further embodiment of the present invention describes a system for optimizing user equipment performance in long term evolution FDD and TDD co-existent networks. The system comprises means for determining a network load of a first network, means for providing a handover command signal to a second network for sharing the network load when the load of the network exceeds a predefined network load, and means for executing a process to handover at least one active connection of at least one user equipment from the first network to the second network. Here the means for determining is performed using a processor and a transceiver, the means for providing is performed using a processor and a transceiver, the means for executing is performed using a processor and a transceiver.

Figure 6:
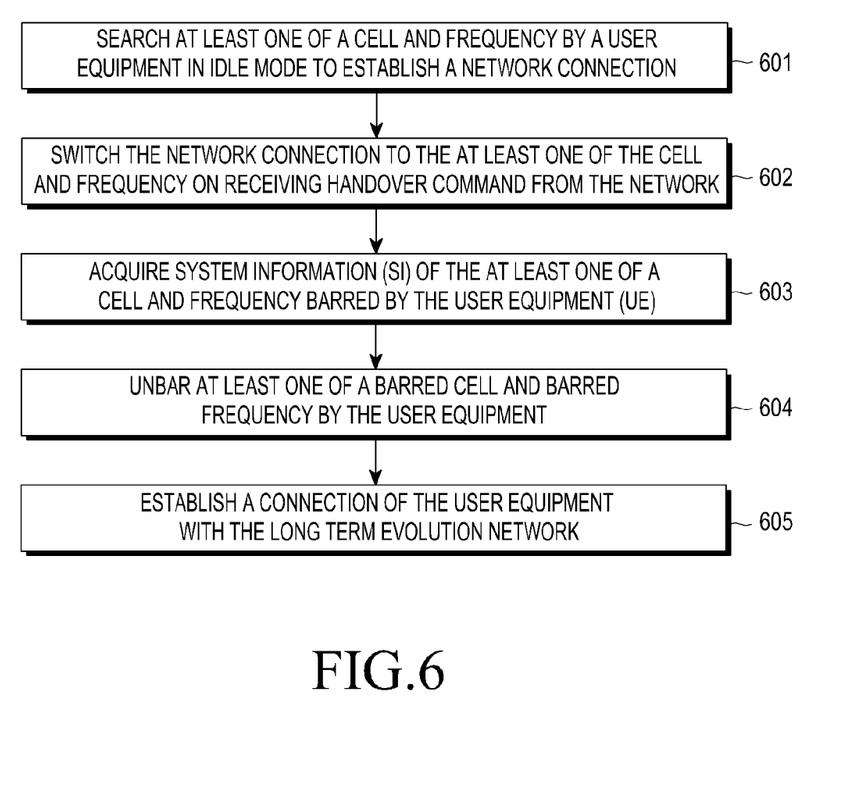
FIG. 6 illustrates a flow diagram of a method of optimizing user equipment performance in long term evolution FDD and TDD co-existent networks according to an embodiment of the present invention.

FIG. 6 illustrates a flow diagram method of optimizing user equipment performance in long term evolution FDD and TDD co-existent networks according to an embodiment of the present invention. At least one of a cell and frequency is searched by a user equipment in idle mode to establish a network connection at step 601. The network connection is switched to the at least one of the cell and frequency on receiving handover command from the network at step 602. System information (SI) of the at least one of a cell and frequency barred by the user equipment (UE) is acquired at step 603. At least one of a barred cell and barred frequency is unbarred by the user equipment in the absence of at least one of a unbarred cell and unbarred frequency at step 604. A network connection of the user equipment is established with the long term evolution network at step 605.

Figure 7:
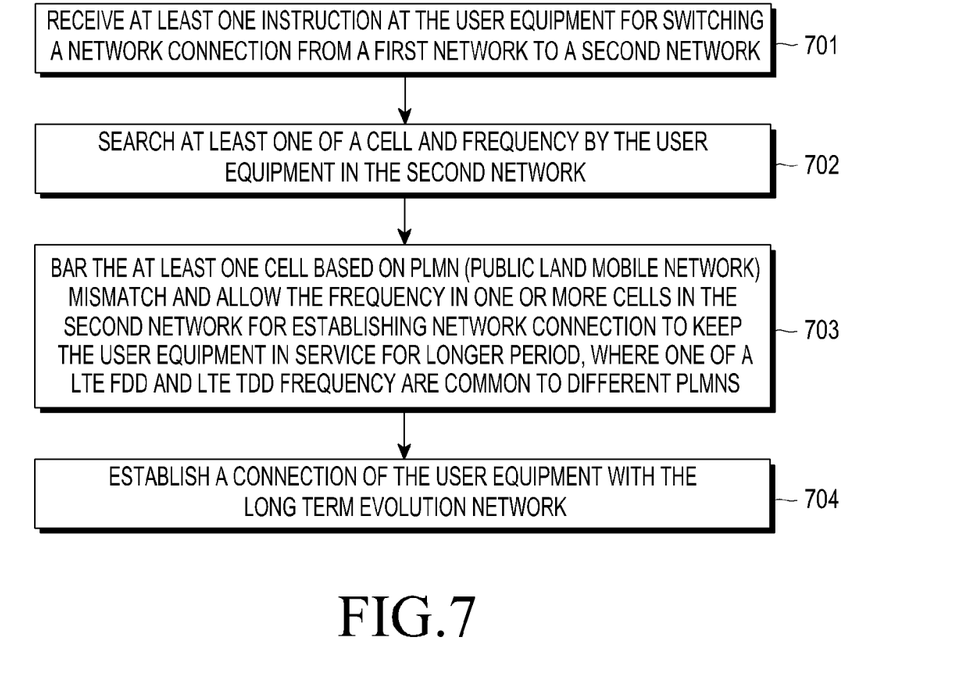
FIG. 7 illustrates a flow diagram of a method of optimizing user equipment performance in long term evolution FDD and TDD co-existent networks according to another embodiment of the present invention.

FIG. 7 illustrates a flow diagram of method of optimizing user equipment performance in long term evolution FDD and TDD co-existent networks according to another embodiment of the present invention. At least one instruction is received at the user equipment for switching a network connection from a first network to a second network at step 701. At least one of a cell and frequency is searched by the user equipment in the second network. The at least one cell is barred based on PLMN (Public land mobile network)

mismatch, and the frequency in one or more cells in the second network is allowed for establishing network connection to keep the user equipment in service for longer period at step 702. Here one of a LTE FDD and LTE TDD frequency is common to different PLMNs. A connection of the user equipment is established with the long term evolution network at step 703.

Figure 8:
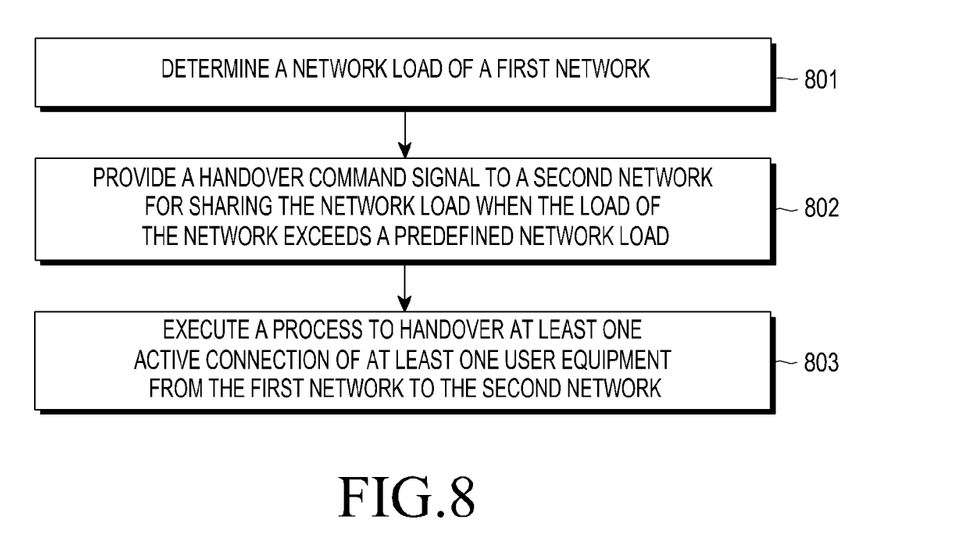
FIG. 8 illustrates a flow diagram of a method of optimizing user equipment performance in long term evolution FDD and TDD co-existent networks according to yet another embodiment of the present invention.

FIG. 8 illustrates a flow diagram of method of optimizing user equipment performance in long term evolution FDD and TDD co-existent networks according to yet another embodiment of the present invention. A network load of a first network is determined at step 801. A handover command signal is provided to a second network for sharing the network load when the load of the network exceeds a predefined network load at step 802. A process to handover at least one active connection of at least one user equipment is executed from the first network to the second network at step 803.

Although the invention of the method and system has been described in connection with the embodiments of the present invention illustrated in the accompanying drawings, it is not limited thereto. It will be apparent to those skilled in the art that various substitutions, modifications and changes may be made thereto without departing from the scope and spirit of the invention. The methods and claims defined in this invention is applicable for all 3GPP and 3GPP2 technology like UMTS, WCDMA, GSM, CDMA etc.

What is claimed is:

1. A method of optimizing user equipment performance in long term evolution FDD and TDD co-existent networks, the method comprising:
   searching at least one of a cell and frequency by a user equipment in idle mode to establish a network connection;
   switching the network connection to the at least one of the cell and frequency on receiving handover command from the network;
   acquiring system information (SI) of the at least one of a cell and frequency barred by the user equipment (UE);
   unbarring at least one of a barred cell and barred frequency by the user equipment;
   removing restrictions on one or more home public land mobile network (HPLMN) cells for the barred frequency on receiving a command signal from a non-access stratum (NAS); and
   establishing a connection of the user equipment with a long term evolution network.

2. The method as claimed in claim 1, wherein unbarring the at least one of the barred cell and barred frequency by the user equipment is performed on acquiring the system information of the at least one of the barred cell and the barred frequency during a process of successful cell handover.

3. The method as claimed in claim 1, wherein unbarring the at least one the barred cell and frequency by the user equipment during a process of scanning of one or more PLMNs of the at least one the barred cell and frequency when the user equipment is unable to detect the unbarred cell.

4. The method as claimed in claim 1, wherein unbarring the at least one of the barred cell and frequency by the user equipment on acquiring system information of the at least one of the barred cell and frequency when the user equipment is unable to detect the unbarred cell.

5. The method as claimed in claim 1, wherein unbarring the at least one the barred cell and frequency by the user equipment is performed to the at least one a cell and frequency barred by the user equipment.

6. The method as claimed in claim 1, wherein the user equipment bars the at least one the cell and frequency in the absence of the system information.

7. The method as claimed in claim 6, wherein the absence of system information of the at least one of the barred cell and frequency with the user equipment is due to the reason that the network is unable to send the system information.

8. The method as claimed in claim 6, wherein the absence of system information of the at least one of the barred cell and frequency with the user equipment is due to the reason that UE is unable to decode the system information.

9. A method of optimizing user equipment performance in long term evolution FDD and TDD co-existent networks, the method comprising:
   receiving at least one instruction at the user equipment for switching a network connection from a first network to a second network;
   searching at least one of a cell and frequency by the user equipment in the second network;
   barring the at least one cell based on PLMN (Public land mobile network) mismatch and allowing the frequency in one or more cells in the second network for establishing network connection to keep the user equipment in service, where one of a LTE FDD and LTE TDD frequency being common to different PLMNs; and
   establishing a connection of the user equipment with a long term evolution network.

10. The method as claimed in claim 9, wherein the first network comprises one of a FDD LTE network and TDD LTE network.

11. The method as claimed in claim 9, wherein a second network comprises one of a FDD LTE network and TDD LTE network.

12. The method as claimed in claim 9, wherein barring the at least one cell and allowing the frequency in one or more cells when reselection of the second network fails due to PLMN mismatch.

13. A method for optimizing user equipment performance in long term evolution FDD and TDD co-existent networks, the method comprising
   determining a network load of a first network;
   providing a handover command signal to a second network for sharing the network load when the load of the network exceeds a predefined network load; and
   executing a process to handover at least one active connection of at least one user equipment from the first network to the second network,
   wherein the executing of the process to handover comprises receiving E-UTRAN system information and cell ID in a RRC connection release message along with redirection information to handover the at least one active connection to the second network.

14. The method as claimed in claim 13, wherein the first network comprises one of a FDD LTE network and TDD LTE network.

15. The method as claimed in claim 13, wherein a second network comprises one of a FDD LTE network and TDD LTE network.

16. A system for optimizing user equipment performance in long term evolution FDD AND TDD co-existent networks, the system comprising:
   means for searching at least one of a cell and frequency by a user equipment in idle mode to establish a network connection;

means for switching the network connection to the at least one of the cell and frequency on receiving handover command from the network;

means for acquiring system information (SI) of the at least one of a cell and frequency barred by the user equipment (UE);

means for unbarring at least one of a barred cell and barred frequency by the user equipment;

means for removing restrictions on one or more home public land mobile network (HPLMN) cells for the barred frequency on receiving a command signal from a non-access stratum (NAS), and means for establishing a connection of the user equipment with a long term evolution network.

17. A system of optimizing user equipment performance in long term evolution FDD and TDD co-existent networks, the system comprising:

means for receiving at least one instruction at the user equipment for switching a network connection from a first network to a second network;

means for searching at least one of a cell and frequency by the user equipment in the second network;

means for barring the at least one cell based on PLMN (Public land mobile network) mismatch and allowing the frequency in one or more cells in the second network for establishing network connection to keep the user equipment in service, where one of a LTE FDD and LTE TDD frequency being common to different PLMNs; and means for establishing a connection of the user equipment with a long term evolution network.

18. A system for optimizing user equipment performance in long term evolution FDD and TDD co-existent networks, the system comprising means for determining a network load of a first network;

means for providing a handover command signal to a second network for sharing the network load when the load of the network exceeds a predefined network load;

means for executing a process to handover at least one active connection of at least one user equipment from the first network to the second network, wherein the means for executing the process to handover comprises receiving E-UTRAN system information and cell ID in a RRC connection release message along with redirection information to handover the at least one active connection to the second network.

* * * * *